US008770821B2

(12) United States Patent
Ijzerman et al.

(10) Patent No.: US 8,770,821 B2
(45) Date of Patent: Jul. 8, 2014

(54) OPTICAL ARRANGEMENT WITH A LIGHT TRANSMITTING LAYER ARRANGED TO COVER A PORTION OF LIGHT ENTRY SURFACE OF LIGHT GUIDE AND TO TRANSMIT LIGHT DIFFUSIVELY

(75) Inventors: Willem Lubertus Ijzerman, Eindhoven (NL); Michel Cornelis Josephus Marie Vissenberg, Eindhoven (NL); Leendert Van Der Tempel, Eindhoven (NL); Florian Cosmin Sabou, Jibou (RO)

(73) Assignee: Koninklijke Philips N.V., Eindhoven (NL)

( * ) Notice: Subject to any disclaimer, the term of this patent is extended or adjusted under 35 U.S.C. 154(b) by 607 days.

(21) Appl. No.: 12/595,049

(22) PCT Filed: Apr. 10, 2008

(86) PCT No.: PCT/IB2008/051355
§ 371 (c)(1),
(2), (4) Date: Oct. 8, 2009

(87) PCT Pub. No.: WO2008/126023
PCT Pub. Date: Oct. 23, 2008

(65) Prior Publication Data
US 2010/0053959 A1 Mar. 4, 2010

(30) Foreign Application Priority Data
Apr. 16, 2007 (EP) .................................. 07106216

(51) Int. Cl.
*F21V 7/04* (2006.01)
*G02B 6/00* (2006.01)
(52) U.S. Cl.
CPC ............ *G02B 6/0046* (2013.01); *G02B 6/0028* (2013.01); *G02B 6/00* (2013.01)
USPC ............ 362/628; 362/608; 362/615; 362/616

(58) Field of Classification Search
CPC .... G02B 6/0066; G02B 6/0068; G02B 6/007; G02B 6/0073; G02B 6/00; G02B 6/0011; G02B 6/0028; G02B 6/0046; G02B 6/0023
USPC ......... 362/608–609, 612, 606, 607, 616, 628, 362/615
See application file for complete search history.

(56) References Cited
U.S. PATENT DOCUMENTS 7,182,498 B2 * 2/2007 Schultz et al. ................ 362/609
7,572,045 B2 * 8/2009 Hoelen et al. ................ 362/628
(Continued)

FOREIGN PATENT DOCUMENTS
EP         1860173 A1   11/2007
WO     2006098132 A1    9/2006

*Primary Examiner* — Robert May

(57) ABSTRACT

An optical arrangement comprising a light guide (101) having a light-entry portion (103) with a light-entry surface (105), a tapering portion (107) with a light reflecting surface, and a light-exit surface (109). The light-entry portion (103) is arranged to guide light from the light-entry surface (105) in a first direction (x) towards the light reflecting surface (H I), the light reflecting surface being arranged in relation to the first direction (x) so that incident light from the light-entry portion (103) is reflected towards the light-exit surface (109). A light transmitting layer (113) is adapted to transmit light diffusively and arranged to cover at least a portion of the light-entry edge surface (105) of the light guide (101). The arrangement is e.g. suitable for use in a LED based luminaire and allows for efficiency and forming of a light beam able to fulfill glare requirements. The arrangement may advantageously be used in a downlighting application.

13 Claims, 7 Drawing Sheets

(56) References Cited

U.S. PATENT DOCUMENTS

| | | | |
|---|---|---|---|
| 7,607,814 B2 * | 10/2009 | Destain | 362/609 |
| 7,891,852 B2 * | 2/2011 | Pugh et al. | 362/606 |
| 7,909,496 B2 * | 3/2011 | Matheson et al. | 362/609 |
| 2001/0046365 A1 | 11/2001 | Bohle et al. | |
| 2004/0207999 A1 | 10/2004 | Suejorp et al. | |

\* cited by examiner

OPTICAL ARRANGEMENT WITH A LIGHT TRANSMITTING LAYER ARRANGED TO COVER A PORTION OF LIGHT ENTRY SURFACE OF LIGHT GUIDE AND TO TRANSMIT LIGHT DIFFUSIVELY

FIELD OF THE INVENTION

The present invention relates generally to an optical arrangement comprising a light transmitting layer adapted to transmit light diffusively.

BACKGROUND OF THE INVENTION

As the efficacy (lm/Watt) of light emitting diodes (LEDs) increases and prices go down, it is expected that LED illumination and LED based luminaires soon will be serious alternatives to and at a competitive level with hitherto predominant tube luminescent (TL) based luminaires.

However, one issue with LED lighting is the provision of warm white light. All today available LEDs with high lumen efficacy (~75 lm/Watt) produce light with a high color temperature (~6000 K) and are perceived as cold white. For most general illumination applications a color temperature of 3000 K or less is preferred. In addition, the light should have a good color rendering index.

Low color temperature with a good color rendering index can be accomplished by means of phosphor in combination with illumination of a LED.

Conventionally, the phosphor is embedded in glue that is directly attached to the LED chip. However, a problem with such a solution is that the phosphor has to withstand the temperature of the LED and the light flux at the same time. The result is often that this type of LED and phosphor solution does not meet the lifetime requirements necessary. A remedy to this particular problem is to avoid attaching the phosphor directly to the LED chip, but this results in other side effects and problems.

For example, remote phosphor solutions of this kind result in that many solutions developed for ordinary LEDs are no longer compatible, not possible to use, not able to fulfill luminaire requirements etc. For example, professional lighting systems have to fulfill requirements with respect to the angular distribution of the light (glare regulations), see the IESNA Lighting Handbook, $9^{th}$ edition. It has been shown that it is particularly difficult to fulfill these requirements with a remote phosphor solution, partly owing to that the remote phosphor conversion of light results in a larger light source with light being emitted from a larger surface.

Another problem related to LED based luminaires is that these luminaires, and LEDs generally, provide light that is very bright. Diffusing the light from a LED based luminaire may remedy this, but makes it difficult to provide light that fulfills requirements regarding angular distribution.

SUMMARY OF THE INVENTION

Hence, in view of the above, it is an object of the present invention to overcome or at least alleviate problems in the prior art and/or to provide an alternative luminaire arrangement. A specific object is to provide a luminaire arrangement that is particularly suitable for use in a LED based luminaire and that allows for efficiency and forming of a light beam fulfilling glare requirements.

The invention is defined by the appended independent claim. Preferred embodiments are set forth in the dependent claims and in the following description and drawings.

Hence, according to one aspect, the above-mentioned and other objects that will be evident from the following description, are achieved by an optical arrangement comprising a light guide having a light-entry portion with a light-entry surface, a tapering portion with a light reflecting surface, and a light-exit surface, the light-entry portion being arranged to guide light from the light-entry surface in a first direction towards the light reflecting surface, the light reflecting surface being arranged in relation to the first direction so that incident light from the light-entry portion is reflected towards the light-exit surface; and a light transmitting layer adapted to transmit light diffusively and arranged to cover at least a portion of the light-entry surface of the light guide.

A "wedge shaped" light guide of this kind is known from US20010046365A1, but is only described for incoupling of light by direct illumination from fluorescent tubes or light bulbs. Nothing is disclosed in US20010046365A1 about, nor teached in the direction of, incoupling of light by a light transmitting layer, and nothing is disclosed about, nor teached in the direction of using the light guide in a LED based luminaire and/or using it in luminaires targeted to solve the aforementioned problems related to such luminaires.

In fact, the present invention is partly based on the finding that a light guide of the present "wedge shaped" kind, advantageously may be used in a LED based luminaire and that it allows for at least alleviating the aforementioned problems.

In the present luminaire arrangement, the light transmitting layer allows for controlled and efficient incoupling of diffuse light transmitted from a comparatively large area into the light guide. Dimensioning of the light guide allows for forming the incoupled light into a light beam having predetermined properties when leaving the light guide, which properties allow for fulfillment of luminaire requirements, e.g. as regards to angular distribution and glare.

The light transmitting layer may be a light transmissive layer adapted to diffuse incident light and output the diffused light from the side of the layer facing the light-entry surface. Hence, problems related to light source brightness can be remedied or alleviated without using a diffuser at the luminaire output.

The light transmitting layer may also be a light emitting layer adapted to emit light in response to excitation. The light emitting layer may thus be a layer that can generate light and not a translucent layer that merely forwards light through the layer. The light emitting layer may be a layer adapted to emit light in response to excitation by light, preferably a phosphor layer. It has been found that increased efficiency is particularly desirable/needed in slim luminaires (large light output area compared to thickness) from which a uniform and "non-glare" light is desirable to provide. In such luminaires the active phosphor area for re-generating the light will be relatively small compared to the total light output area of the luminaire (in order to be able to provide collimated light within glare requirements and still keep the luminaire thin).

The optical arrangement may further comprise a light source, preferably a light emitting diode (LED) or a laser diode, arranged to directly or indirectly illuminate the light transmitting layer.

The optical arrangement may comprise a re-transmitting light source arranged to illuminate the light transmitting layer in response to illumination by the light source. The re-transmitting light source may be adapted to emit light in response to excitation by light, preferably by comprising a phosphor material. This e.g. allow a phosphor layer to be used to generate light, e.g. by illumination from a LED, without arranging the phosphor to cover the light-entry surface, and thus the phosphor can be shielded from being visible via the light-exit surface. One advantage from this is that a colored appearance, such as yellow, can be avoided when e.g. a luminaire comprising the optical arrangement is in a off-state.

The light transmitting layer may cover the light-entry surface in such way that the light transmitting layer substantially shields the light-entry surface from direct illumination by the light source.

The light-entry surface and the light transmitting layer may encircle a space. By "encircle a space" is meant that there exists at least one plane that intersects said space and which plane, in virtually all directions from a position in the space, also intersects the light emitting layer and the light-entry surface. As a result, the light transmitting layer will emit light towards the light guide side or towards the space side. In the latter case, owing to the encircled space, light from the light transmitting layer may be incident either on another portion of the light-entry surface and/or the light transmitting layer, which means the light can be efficiently utilized and it reduces the risk of light escaping the light guide in an undesirable manner. Another result is that the light transmitting layer, despite being a layer, may act as a single centrally placed light source emitting light omnidirectionally into the light guide, and that the reflecting surface will be able to reflect light to cover a large light-exit surface area. In case there is a light source, such as a LED, arranged to directly or indirectly illuminate the light transmitting layer, the light source may be arranged in the space, or at least so that it illuminates the light emitting layer via the space.

The light guide may be substantially rotational symmetric in a plane, preferably substantially circular symmetric, with the center of symmetry located in the encircled space. Rotational symmetry enables for provision of a symmetric light beam which often is desirable in lighting applications, such as in downlighting applications.

The light transmitting layer may be arranged less than 1 mm, preferably substantially equidistantly, from the light-entry surface, and more preferably as close as possible to the light-entry surface without being in optical contact. An advantage from non-optical contact is that refraction of light rays emitted by the light emitting layer and that are coupled into the light guide, will be refracted with a collimating effect.

Alternatively, the light transmitting layer may be in optical contact with the light-entry surface. This has another advantage, viz. that light more efficiently can be coupled into the light guide since reflections in the light-entry surface can be avoided.

The reflecting surface may be obliquely arranged in relation to the light-exit surface at an angle in a range of 1°-20°, preferably 4°-12°.

The light-entry portion may increase in thickness from the light-entry surface towards the tapering portion. An increase of the thickness, for example by a linear slope, reduces the angle of incidence on the inner light guide surfaces of light being coupled in via the light-entry surface, and is thus beneficial for accomplishing total internal reflection (TIR) avoiding that light that entering the light guide is coupled out undesirably.

The light-entry portion may have at least a sub-portion of substantially constant thickness along the first direction. Constant thickness and thus parallel opposite surfaces where reflection and refraction of light can occur inside the light guide, have a collimating effect of the light being guided and that eventually will be coupled out via the light-exit surface.

The light guide may be a flat structure, preferably in a plane substantially perpendicular to the light-entry surface.

"Flat" in this sense is when the dimensions in one plane of the light guide is magnitudes greater, such as at least 3 times greater, than the dimension along a normal to that plane. The reflecting surface allows for outcoupling of light covering a large part of the plane of flatness of the light guide. Typically the light-exit surface is parallel to the plane of flatness. A flat light guide and a flat luminaire based on this light guide, which are able to provide light via the plane of flatness, can be made with a very discrete appearance.

The arrangement may further comprise a light transmissive re-direction layer covering at least a portion of the light-exit surface of the light guide. By "transmissive redirection layer" is meant a layer with low optical absorption that has the ability to change direction of light passing through the layer in a predetermined manner.

The re-direction layer may thus make secondary adjustments to the light, such as final tuning of the light beam to be provided, typically by focusing or diffusing the light leaving the light guide. The splitting of the "beam-shaping" functionality into separate parts allows each part to solve separate sub-problems, which facilitate design and implementation. For example, it may be enough that the light leaving the light guide via the light-exit surface is collimated only to a certain degree since the re-direction layer can take care of the last focusing, which i.a. means that the output from the light guide can be more permissive allowing for greater freedom in the design of the light guide. A separate redirection layer also allow for convenient adaptation, e.g. by replacing only the re-direction layer when requirements of the light beam to be provided changes.

The re-direction layer may comprise at least one triangular element formed in the surface of the layer, said element may have a first triangle surface facing towards the light-entry surface side of the light guide arranged at a first angle in relation to the normal to the plane of the layer, and may have a second triangle surface facing away from the light-entry surface side of the light guide arranged at a second angle in relation to the normal to the plane of the layer, said first and second triangle surfaces may meet at a tip of the triangular element.

The at least one triangular element may encircle a point in the plane of the re-direction layer, and the re-direction layer may be is substantially rotational symmetric in the plane of the layer, preferably circular symmetric, with the center of symmetry being the encircled point. This may be particularly advantageous in combination with a rotational symmetric light guide, and in such case the center of symmetry is preferably the same and the symmetry planes parallel.

The at least one triangular element may be formed on the side facing the light guide with the triangular element tip pointing towards the light guide. The first angle added to the second angle may be in the range of 35°-45°, preferably in the range of 38°-42°, more preferably about 40°. The first angle preferably is more acute than the second angle. The first angle may be in the range 1°-17°, preferably 2°-12° and the second angle may be in the range 28°-44°, preferably 30°-38°.

The optical arrangement may further comprise a second light guide arranged to guide light to the light transmitting layer, said second light guide being adapted to guide light in its interior along a guide direction using reflections in lateral surfaces of the second light guide, which surfaces are substantially parallel to said guide direction, the second light guide having a light input area for in-coupling of light and a light output area for output of light to the light transmitting layer, wherein the light output area is arranged at a distance from the light input area in the guide direction. The second light guide allows for improved efficiency with more reaching the light transmitting layer. It also provide means for distributing and mixing light in a controlled manner before it reaches the light transmitting layer.

The second light guide may be of a dielectric material capable of guiding light inside the material and the light input area and the light output area may correspond to a respective input surface and output surface of said light guide. By "surface" is included both inner and outer surfaces of the light guide. A "surface" may further be a full surface, e.g. a full edge surface, or a portion thereof.

A light source may be arranged opposite to the input surface to provide light in the guide direction towards the light input surface. Except from being a straightforward and efficient way of coupling light into the light guide, this allows for coupling light into the light guide from the side via end surfaces perpendicular to the guide direction, which in turn allows for keeping electronic components such as LEDs away from the internal, or inner parts of light guide and luminaire.

The first input surface may be is convex, preferably with linear slope and/or it may have undulations, preferably with linear slope. Owing to the convex or undulated input surface light that is emitted straight along the axis of the light guide become directed towards the lateral surfaces which increase the amount of light incident on the light transmitting layer.

The optical arrangement may further comprise a second light source, preferably a LED, arranged to provide light to a second light input surface arranged opposite to the first light input surface in the guide direction, whereby light can be coupled into the second light guide from opposite directions, preferably the first and second light input surface and respective thereto adjoining portions of the second light guide are of substantially same shape.

The light input area may intersect the guide direction, preferably substantially perpendicularly, and the light input surface may be in optical contact with a dielectric medium of lower refractive index, such as air, whereby any light provided to be incident on the light input surface will pass through this medium and be coupled into the second light guide at angles within a determined angular interval that is more narrow than an angular interval of the incident light. The difference in refractive index between the second light guide and the dielectric medium may be at least what is required to reach total internal reflection in the lateral surfaces for substantially all light within the angular interval. The difference in refractive index between the second light guide and the dielectric medium is preferably at least about 1.4. This promotes total internal reflection (TIR) in the lateral surfaces for any input angle (i.e. a maximal first angular interval of ±90°) when the lateral surfaces are perpendicular (or at a larger angle) in relation to the input surface and in optical contact with a medium having the same or less refractive index as for the input surface, e.g. as is the case when both are in optical contact with air. It is understood that if the angular interval is more narrow than ±90°, the refractive index can be less than the above and still total internal reflection for all incoupled light can be accomplished. It should be noted that parts can be in mechanical contact without there being optical contact, e.g. the second light guide may have a lateral surface in contact with an object although there is no, or substantially no, optical contact in between, instead, e.g. if the mechanical contact is made in an air atmosphere, there can be a sufficiently small gap inbetween whereby the optical contact instead is with the air.

The light output surface may be a portion of one of the lateral surfaces, which portion is in optical contact with and at least partially covered by the light transmitting layer. The light transmitting layer is hence arranged in a parallel relationship to the guide direction of the second light guide. Light will thus be guided and reach the light transmitting layer by reflections in the lateral surfaces, which facilitates shielding of the light transmitting layer from direct illumination by a light source. It also allows light to distribute and spread in the light guide before output, for example in case multiple light sources are used to produce the light being coupled into the light guide.

A fully reflecting reflector layer may be arranged opposite to the light transmitting layer on an opposite side of the second light guide, preferably in non-optical contact with the second light guide. The reflector layer may be a wall portion of a reflector housing at least laterally enclosing the second light guide to prevent undesired outcoupling of light via the lateral surfaces of the light guide, and the housing is preferably in non-optical contact with the second light guide and provided with an opening for the light transmitting layer.

The light guide may have additional spaced apart light output surfaces, each of which may be a respective portion of one of the lateral surfaces and which respective portion may be in optical contact with and at least partially covered by a respective light transmitting layer. Hence the light in the light guide, such as coupled into the second light guide by one or a few light sources, can be used to illuminate multiple light transmitting layers, with the light first distributing and spreading in the light guide.

The light entry portion may comprise a funnel-shaped portion with a wider end of the funnel facing the tapering portion and a narrow end of the funnel comprising the light-entry surface. Lateral surfaces of the funnel, in relation to the first direction, may be in optical contact with a dielectric medium of lower refractive index, such as air. The light entry portion and the tapering portion may belong to separate parts of the light guide in optical contact with each other.

The light entry portion may comprise several such funnel shaped portions lined up with parallel wider funnel end surfaces in substantially the same plane.

According to another aspect:

The light output surface may intersect the guide direction, preferably perpendicularly, the light output surface being in optical contact with a dielectric medium of lower refractive index, such as air, whereby light leaving the second light guide via the light output surface will pass through this medium. This means that also light being backscattered from the light transmitting layer and directed towards the light output surface will pass through the medium, which promotes that back-scattered light reenters the second light guide at TIR angles.

The light output surface may be arranged substantially perpendicularly in relation to the light transmitting layer. As a result, only some light from the light output surface, i.e. light that is directed towards the light transmitting layer when leaving the light output surface, will be incident on the light transmitting layers, i.e. light is "portioned out" to the light transmitting layer. The light that is not incident can thus be used for other purposes, e.g. to continue further in the guide direction to additional light transmitting layers, e.g. after being coupled into another light guide.

The output surface may face a light output cavity, the light transmitting layer being at least part of a lateral closing surface to said cavity.

The optical arrangement may further comprise a reflector layer arranged as at least part of a lateral closing surface to said cavity opposite to the light transmitting layer, preferably the reflector is arranged to reflect back-scattered light from the light transmitting layer back towards the light transmitting layer, such as by being a specular reflector directly facing the light transmitting layer.

The optical arrangement may further comprise an additional light guide having substantially the same properties and shape as the second light guide, the additional light guide may have a light output surface forming at least part of a closing surface to said light output cavity opposite to the output surface of the second light guide. It should be generally understood that the light output cavity can be closed by different combinations of light output surfaces, reflectors and light transmitting layers. Although in principle also a light source surface can take part in closing a light output cavity, this would mean that light will not be able, as is typically desirable, to mix and distribute before being incident on the light transmitting layer.

The light entry portion may comprise a funnel-shaped portion with a wider end of the funnel facing the tapering portion and a narrow end of the funnel comprising the light-entry surface. Lateral surfaces of the funnel, in relation to the first direction, are in optical contact with a dielectric medium of lower refractive index, such as air.

The light entry portion and the tapering portion may belong to separate parts of the light guide in optical contact with each other.

The light entry portion may comprise several such funnel shaped portions lined up with parallel wider funnel ends in substantially the same plane.

All cavity surfaces perpendicular to the light transmitting layer may be light output surfaces of the second light guide. The second light guide may be formed as a plate, the cavity being formed by a hole in said plate.

The light transmitting layer may be a portion of a larger light transmitting layer covering the plate and multiple cavity holes therein.

The light guide may be in the form of a layer comprising multiple funnel-shaped light guide elements, the light entry portion may comprise narrow end portions of the funnel-shaped light guide elements and the tapering portion may comprise wider end portions of the funnel-shaped light guide elements, the light exit surface comprising end surfaces of said wider end portions.

A light source surface comprising a light source, preferably a light emitting diode (LED), may be arranged substantially perpendicular in relation to the light input surface.

The input surface may face a light input cavity, the light source surface being at least part of a lateral closing surface to said cavity.

The optical arrangement may further comprise a reflector layer arranged as at least part of a lateral closing surface to the light input cavity opposite to the light source surface, preferably the reflector is arranged to reflect light towards the light input surface, such as by being a diffusive reflector and/or by having a sloped surface. Hence light that is not directly incident on the light input surface or reflected therefrom, is promoted to be indirectly incident thereon, which increase efficiency.

Moreover, the optical arrangement may further comprise an additional light guide having substantially same properties and shape as the second light guide, the additional light guide having a light input surface forming at least part of a closing surface to said cavity opposite to the input surface of the second light guide.

It is understood that sides of the light input cavity generally can be closed by different combinations of light input surfaces, reflectors and light source surfaces. However, what specifically is possible depends on how the optical arrangement is used. Although in principle also the light transmitting layer can take part in closing a light input cavity, this means that light will not be able, as is typically desirable, to mix and distribute before being incident on the light transmitting layer.

The light guide, the light transmitting layer and the second light guide may encircle a space in a plane with the light input surface facing the space, whereby the guide direction is a direction in said plane. The light guide, the light transmitting layer and the second light guide may be substantially symmetrical in the plane, preferably circular symmetric, with the center of symmetry located in the encircled space.

The light input surface may be arranged opposite to the light output surface in the guide direction, and the light output surface may be facing the light transmitting layer.

The light input surface and the light output surface may be substantially perpendicularly arranged in relation to the plane.

The light output surface may be in optical contact with a dielectric medium of lower refractive index, such as air, which light to/from the light transmitting layer has to pass. An advantage here is that light being back-scattered from the light transmitting layer towards the light output surface will enter the light-guide at angles promoting TIR, however, as a result also more light may be reflected in the interface and not reach the light transmitting layer in the first place. Alternatively the light output surface may be in optical contact with the light transmitting layer. This has the advantage that light is promoted to be coupled out from the light output surface and not reflected back in the first place, however, there is at the same time an effect of increased amount of light being scattered back from the light transmitting layer into the second light guide at non-TIR angles.

A luminaire and/or a light output device may comprise the optical arrangement. The light output device may be a lighting application, preferably a downlighting application.

It is noted that the invention relates to all possible combinations of features recited in the claims.

BRIEF DESCRIPTION OF THE DRAWINGS

The above, as well as other aspects, objects, features and advantages of the present invention, will be better understood through the following illustrative and non-limiting detailed description, with reference to the appended schematic drawings showing currently preferred embodiments of the invention.

In all figures, the dimensions as sketched are for illustration only and do no reflect the true dimensions or ratios. All figures are schematic and not to scale. In particular the thicknesses are exaggerated in relation to the other dimensions. In addition, details such as LED chip, wires, substrate, housing, etc. have been omitted from the drawings for clarity.

FIG. 1b shows a top view of the luminaire arrangement in FIG. 1a.

FIG. 2b shows a top view of the luminaire arrangement in FIG. 2a.

FIGS. 3b-c show a respective side and top cross-sectional view of the luminaire arrangement of FIG. 3a.

In the drawings the same reference numerals are used for similar or corresponding elements, also when the numerals refer to elements in different embodiments.

DESCRIPTION OF PREFERRED EMBODIMENTS

Figure 1A:
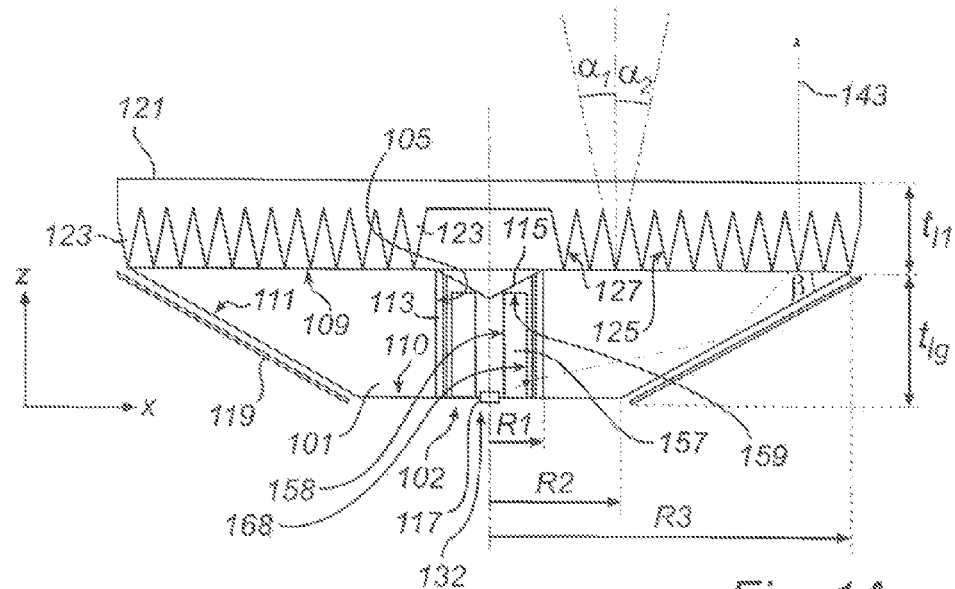
FIG. 1a shows a cross-sectional side view of a luminaire arrangement according to a first embodiment.
Figure 1B:
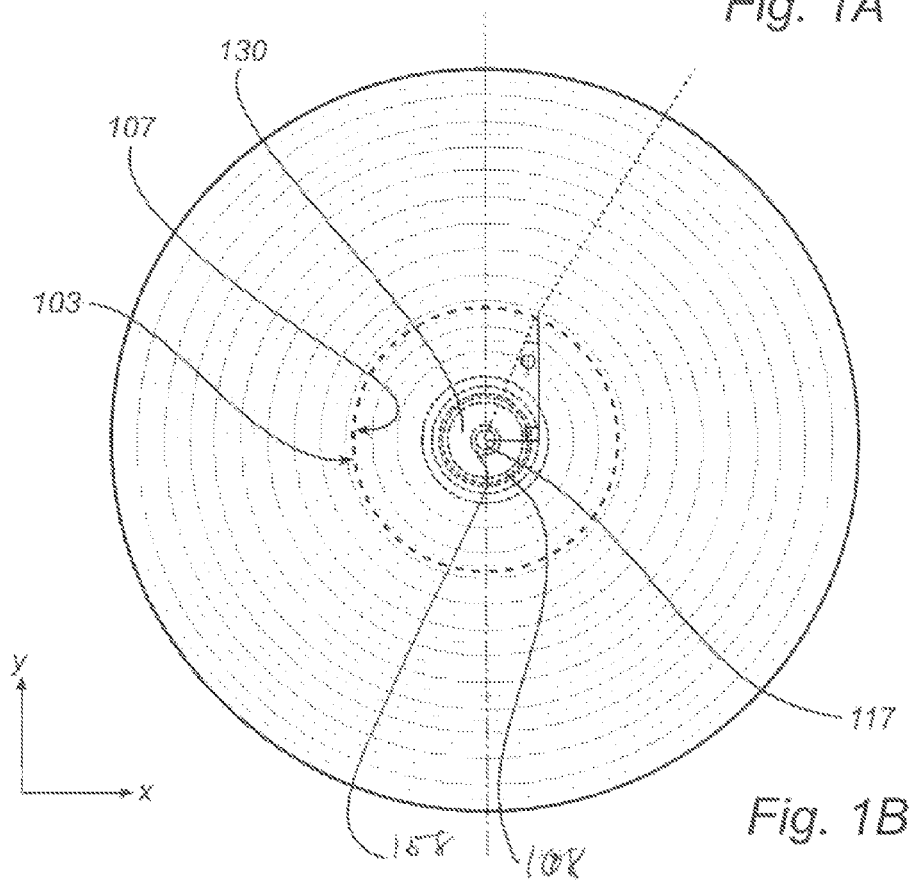

FIGS. 1a-1b show a cross-sectional side view and a top view of a luminaire arrangement according to a first embodiment. The shown luminaire arrangement comprises a light guide 101, here circle symmetric in a plane y-x. The light guide 101 has a cylindrical through-hole 102, which inner side is a light-entry surface 105 covered by a light emitting layer 113, here a layer that emits light upon illumination, preferably a phosphor layer. The light emitting layer 113 is not in direct contact with the light-entry surface 105, instead there is a small, equidistant air gap between the light-entry-surface 105 and the light emitting layer 113. The gap is preferably as small as possible without there being any optical contact between the surface 105 and the layer 113, preferably the gap is less than 1 mm. The layer 113 may even be in mechanical contact with the surface 103, as long as there is no optical contact. Note that in FIG. 1A the shown gap between the layer 113 and the surface 105 is exaggerated. In most implementations the light emitting layer may be considered to be located at the same distance from the center as the light-entry surface.

In the shown embodiment there is a second light guide 157 shaped as a tube, or cylinder with a cylindrical through-hole 132 in the center, concentrically located in the cylindrical through hole 102. The second light guide 157 has a light input surface 158 facing the center of the through-hole 132 and a light output surface 168 facing the light emitting layer. The second light guide further has lateral surfaces 159, i.e. the end surfaces of the cylinder which are perpendicular to the light input and output surfaces 158, 168. These surfaces are preferably not in optical contact with neighboring objects, but instead interfacing an optically less dense medium, preferably air, i.e. are in optical contact with a medium of lower refractive index than the second light guide 157. The light emitting layer 113 is shown at a distance from the light output surface 168 i.e. in non-optical contact with the second light guide, but may in alternative embodiments be in optical contact.

The second light guide 157 provides a collimating effect which increases efficiency. However, it can be noted that the second light guide is not required for the function as such of the luminaire arrangement in FIGS. 1a-b. Hence, in alternative embodiments, the second light guide may be omitted.

At the lower part of the cylindrical through hole 132 there is a light source 117, preferably a light emitting diode (LED), which may be omnidirectional. The light source may be attached to a substrate (not shown), such as a PCB. In other embodiments there may be one or many light sources also at other positions, such as at various positions in the mixing cavity 132. For example, to produce white light a blue LED or LEDs 117 can be used in combination with a yellow or orange phosphor layer 113.

Opposite to the light source 117, at the other end of the cylindrical hole 102, there is a mirror 115 covering the opening of the cylinder. The mirror 115 presents an inclined surface for reflecting light from the light source 117 towards the light emitting layer 113, light which else would escape via the cylinder opening. Since the light source is arranged so that it also illuminates the light emitting layer directly, the mirror 115 is not necessary, although it increases efficiency. Alternatively the mirror may be flat (not inclined) and/or may have diffusely reflective properties for light spreading.

In FIG. 1, when the light source 117 directly or indirectly provides light to the light input surface 158 of the second light guide 157, the light is passing an air interface owing to the through hole 132 and will by this be refracted into an optically denser medium being the second light guide. As a result there will be a collimating effect of the light entering the second light guide 157 and the amount of light that can be guided to the light output surface by total internal reflection (TIR) in the lateral surfaces 159 increases. Preferably the refractive index of the second light guide is at least about 1.4 since that allows for TIR in the lateral surfaces 159 for light incident on the light input surface 158 virtually independent on an angle of incidence, provided that the lateral surfaces are also interfacing air or other medium with similar or lower refractive index. It should be understood that the second light guide 157 also is helpful and efficient for guiding back-scattered light from the light emitting layer entering via the light output surface 168 so that the light, at lower loss, can be incident on the light emitting layer 113 at another location, e.g. at an opposite side of the through hole 132.

In an example implementation it was found that with a second light guide 157 present in the center of the luminaire there was an increase from 70% of light passing the light emitting layer to 87%. Since efficiency drops when the thickness of a luminaire of this kind decreases, due to that more reflections causing losses are required in a thin structure, adding a second light guide 157 can be used to reduce thickness at maintained efficiency.

When the light emitting layer 113 emits light as a response from illumination by the light source 117, it emits light towards the outer side of the light-entry surface 105 of the light guide 101. Owing to that the light emitting layer 113 covers the light-entry surface 105 and is arranged very close to it, light will, via the small air gap, be incident on the light-entry surface 105 at virtually all possible angles of incidence, i.e. from about +90° to −90° in relation to the normal of the light-entry surface 105. The air gap means there will be an interface of lower refractive index to higher refractive index and Snells law will determine a largest entry angle (<90°) of the light entering the light guide 101, i.e. the situation is similar as for the light entering the second light guide. This provides some control of the light entering the light guide 101 and will, for example, make it easier to fulfill requirements related to angular distribution of the light, which will be explained in some detail below.

The light entering the light guide 101 via the light-entry surface 105 is first guided in a light-entry portion 103 of constant thickness, here equal to the thickness $t_{lg}$ of the light guide 101. Light that fulfills the conditions of TIR in inner surfaces 109, 110 of the light guide 101 will be guided towards a tapering portion 107 of the light guide 101, which portion 107 presents a reflecting surface 111 that is inclined and facing in the direction of the light-entry surface 105. The reflecting surface 111 is arranged with an angle β in relation to the normal of the light-exit surface 105 and the plane x-y of the light guide.

The reflecting surface 111 reflects light incident from the light-entry portion 103, i.e. from the x-direction in FIG. 1a, towards a light-exit surface 109, which is in a perpendicular relationship to the light-entry surface 105. In other words, owing to the enclosing light-entry surface 105, light entering via the light-entry surface 105 and traveling in the plane x-y of the light guide 101 is being redirected by the reflecting surface 111 and thus escapes the light guide 101 "out-of-plane" (in the z-direction in FIG. 1*a*) via the light-exit surface 109.

Owing to the "refractive" collimating effect when the light enters the light guide 101 via the light-entry surface 105 and/or the "reflective" collimating effect when the light is guided in the first portion 103 of constant thickness, the reflecting surface 111 can be designed to only handle incident light in a limited angular range, i.e. with a predetermined degree of collimation. The angle β is selected so that a uniform light beam with a desirable beam width (at full-width-at-half-maximum, FWHM) can be achieved. In most practical applications the angle β will be relatively small, such as in the range of 1°-15°.

To ensure that light does not leave the reflecting surface 111 via refraction, a mirror layer 119 may be provided to cover the outside of the reflecting surface 111. Preferably the mirror layer 119 is arranged at a small distance from the light guide surface so that there is no optical contact.

In the plane (x-y) of the light guide 101 there is an angular distribution of the light. Owing to that the light emitting layer 113 will emit light into the light guide via the light-entry surface 105 at a distance of about R1 from the center, not all light will be incident on the reflecting surface 111 at 90° in the x-y plane as would have been the case without the cylindrical hole and instead a "point like" light source in the center of the light guide. Note that this applies in the shown x-y plane and not when light is incident on the reflecting surface from directions that are not in this plane. When light from the light emitting layer is entering the light guide at the distance R1 from the center, a largest angle φ of light incident on the reflecting surface in the plane of the light guide occurs where the tapering portion 107 and the reflecting surface 111 begin, i.e. at a distance R2 from the center. It can be noted that non-optical contact between the light emitting layer 113 and the light-entry surface 105 typically will make the largest angle smaller than the angle φ indicated in the figure when light is refracted into the light guide 101 via the light-entry surface 105.

Still referring to FIGS. 1*a*-1*b*, a transmissive re-direction layer 121 is arranged to cover the light-exit surface 109 of the light guide 101. The re-direction layer 121 may take care of the final adjusting and tuning of the light distribution.

The re-direction layer 121 comprises triangular elements 123 formed in the surface of the layer facing the light-exit-surface 109 of the light guide 101. The triangular elements 123 are in the form of protrusions, or ridges, encircling the center of the light guide in the x-y plane. Each triangular element 123 presents a first surface 125 facing in the direction of the center of the light guide 101, i.e. where light enters the light guide via the light-entry surface 105, and a second surface 127 facing away from the light-entry surface 105. The first surface 125 is arranged at a first angle $\alpha_1$ in relation to the normal to the plane of the layer and the second surface 127 at a second angle $\alpha_2$. The surfaces 125, 127 meet and form the tip of the triangular element 123, which tip may be in contact, but preferably not in optical contact, with the light-exit surface 109. It should be noted that mechanical contact not necessary results in optical contact, as will be recognized by the skilled person. It is mainly "air-pockets" in the form of the valleys between the triangular elements 127 that are directly facing the light guide.

A light ray leaving the light-exit surface 109 of the light guide 101 will thus first be refracted at a light guide to air interface, pass the air filled "valley" between adjacent triangular elements, be refracted in the first surface 125 of a triangular element 123 at an air to re-direction layer interface, and then be reflected by TIR in the second surface 127 of the triangular element 123 at a re-direction layer to air interface. The last reflection directs the light ray towards the opposite surface of the redirection layer 121, which it passes by refraction at a re-direction layer to air interface. The re-direction layer may thus have a collimating and/or focusing effect on the light from the light guide.

It may be noted that the redirection layer 121 shown in FIG. 1*a* has a cavity formed above the mirror 115. However, the exact design of the redirection layer in that area is typically of less significance since it is not participating in the re-direction of light.

Moreover, in FIG. 1*a* trace 143 shows the path of an exemplary light ray emitted by the light emitting layer 113 in response to illumination by the light source 117.

In a first detailed example based on the first embodiment, the light guide 101 is of PMMA and has a refractive index of about 1.5 and the re-direction layer is of PC and has a refractive index of about 1.6.

The material of the light guide 101 and the second light guide 157 may in general and advantageously have an optical absorption less than 0.3/m, provide low haze and scattering, contain particles smaller than 200 nm and be able to sustain an operational temperature higher than 75° C. Since the optical path in the light guide typically is relatively large (e.g. about 50 mm), the material should preferably have high optical transparency and be of good optical quality so that absorption still can be low.

The material of the re-direction layer 121 may generally and advantageously have an optical absorption of less than 4/m, provide low haze and scattering, contain particles smaller than 200 nm, be able to sustain an operational temperature higher than 75° C.

The redirection layer may be similar to a so-called re-direction foil, such as the transmissive right angle film (TRAF) as currently is available under the name Vikuti™ from 3M.

Furthermore, in the first detailed example the light guide 101 has a thickness $t_{lg}$=5 mm and the re-direction layer 121 a thickness $t_{rl}$=3 mm. The light-entry surface 105 is located at a distance R1=20 mm from the center of the light guide, the tapering portion 107 and the reflecting surface 111 begin at a distance R2=30 mm from the center, and the light guide 101 and the reflecting surface 111 end at a distance R3=55.5 mm from the center. The angle β of the reflecting surface 111 is thus about 11° and the area of the light-entry surface 105 and the light emitting layer covering it, is about 600 mm². The light source 117 is a LED of less than 10 W having an area of 3 mm². The light emitting layer is a phosphor layer, such as YAG:Ce (Cerium-doped Yttrium Aluminum Garnet) which is arranged as close as possible to the light-entry surface 105 without optical contact. There is about 100 adjacent triangular elements concentrically arranged about the center of the light guide 101. The first angle $\alpha_1$ of each triangular element 123 is 9° and the second angle $\alpha_2$ is 31°. The first detailed example results in a light beam with a beam width of about 2*30°.

A second detailed example differs from the first detailed example in that R2=80 mm and R3=151 mm, whereby β is about 4.0°. The second detailed example results in a light beam with a beam width of about 2*10°.

A third detailed example differs from the first detailed example in that the first angle $\alpha_1$ of each triangular element 123 is 2° and the second angle $\alpha_2$ is 36°. In comparison with the light beam of the first detailed example, the third detailed example results in a light beam with a reduced "tail", i.e. with less light flux at angles between half the beam width (at FWHM) and the cut-off angle.

Furthermore, in linear systems it has been found that, at least in the range of a reflecting surface having an angle β in the interval 2°-15°, the beam angle being provided is, as a design rule of thumb, about 5 times the angle β.

The number of triangular elements 123 disposed between the center and the perimeter of the light guide 101, i.e. along any radial direction in the x-y plane, is typically not crucial, however, more elements 123 (at constant layer thickness $t_{lg}$), means smaller dimensions of the elements 123, which has the advantage that the elements will be more discrete and virtually invisible. On the other hand, when the dimensions become too small, there is a risk that imperfections in the triangular surfaces 125, 127, e.g. caused by manufacturing, will have increasing and eventually detrimental impact on the light beam to be provided. Hence, care should be taken when increasing the number of and downsizing the triangular elements.

In another embodiment there is a transmissive diffuser layer 113 instead of the light emitting layer 113. Light that pass through the diffuser is being diffused, i.e. here light incident on the inner side becomes diffused light that leaves from the side facing the light-entry surface. The diffuser may diffuse light in directions corresponding to those being provided by the light emitting layer and the diffuser layer may be arranged in relation to the light-entry surface similarly to the light emitting layer.

In yet another embodiment, there is a light emitting layer, such as a phosphor layer, instead of the mirror 117, and instead of the light emitting layer 115 covering the light-entry surface there is a diffuser layer arranged to cover the light-entry surface 105. In this embodiment, the light source 117 emits light that is converted with a re-emitting effect by the light emitting layer and which light then is incident on the diffuser layer. The diffuser layer may be shielded from direct light from the light source.

Figure 2A:
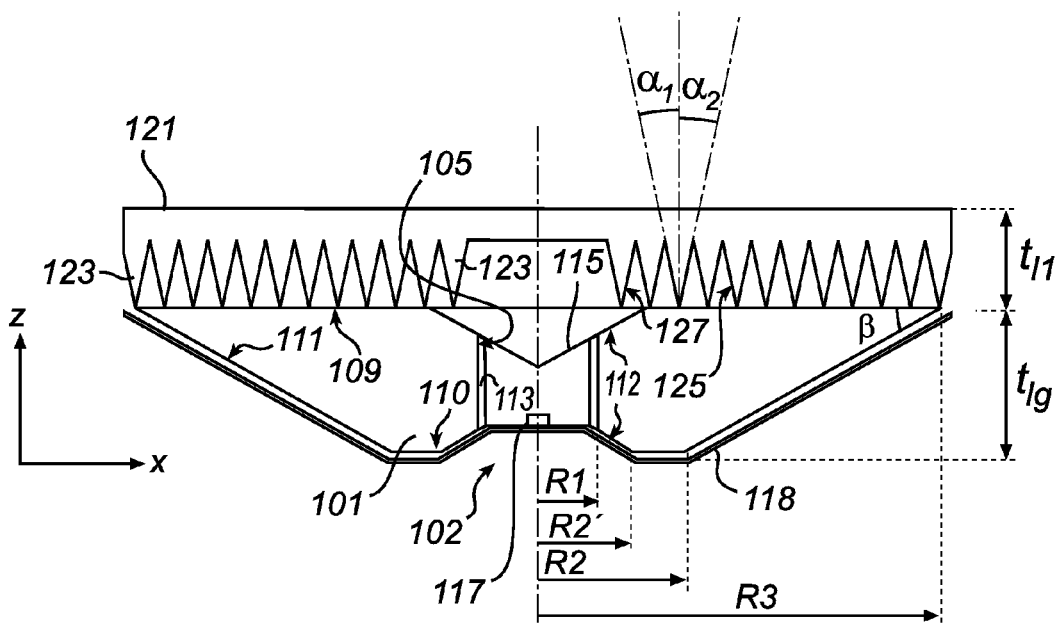
FIG. 2a shows a cross-sectional side view of a luminaire arrangement according to a second embodiment.
Figure 2B:
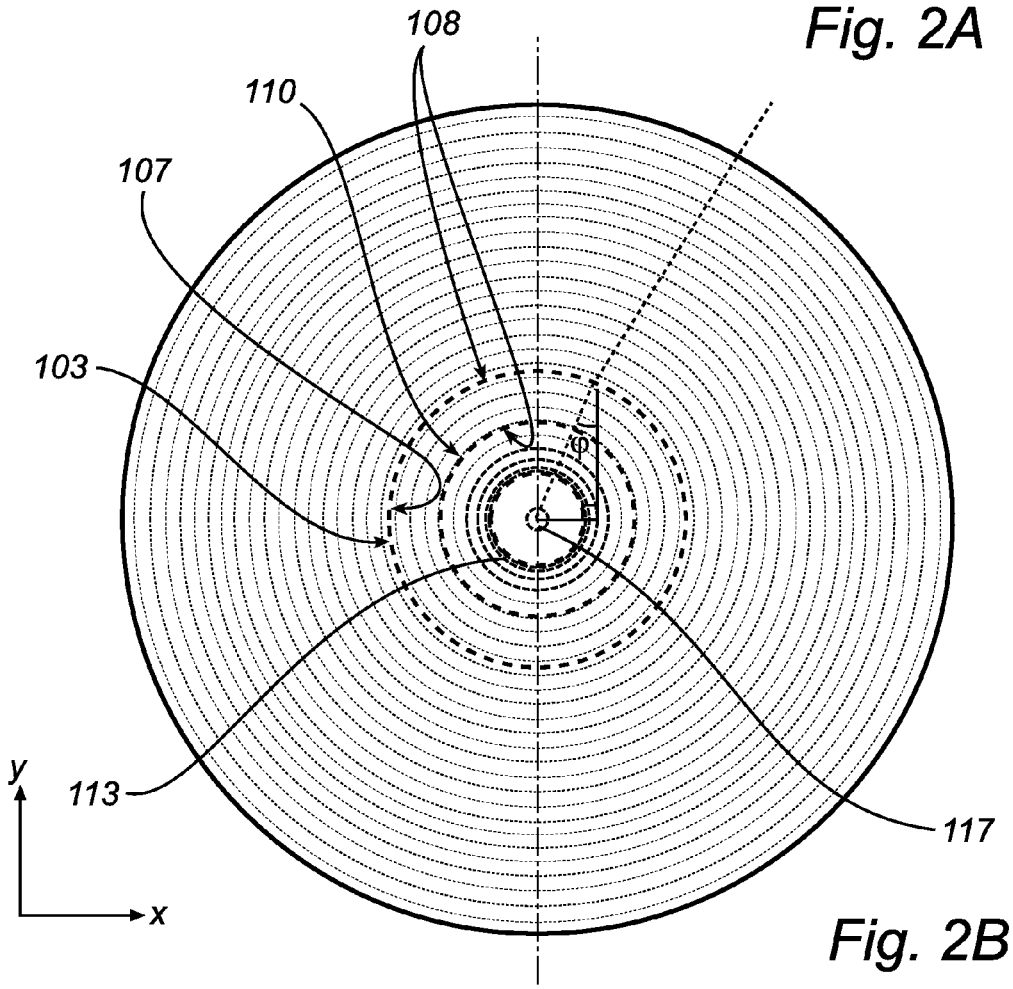

FIGS. 2a-2b show a cross-sectional side view and a top view of a luminaire arrangement according to a second embodiment.

Most is the same in the second embodiment and the first embodiment. However, one difference is that there is no second light guide 157 present and also that the mirror layer 119 has been replaced by a reflecting layer 118 covering not only the outer side of the reflecting surface 111 of the light guide, but also an outer surface side of the surfaces 110, 112 in the light-entry portion 103 and one opening of the cylindrical hole 102. However, it is understood that a second light guide may be used also with the second embodiment. Furthermore the light source 117 is in the second embodiment arranged on the side of the reflecting layer 118 facing the hole 102. The reflecting layer 118 has a mirror, or specularly reflecting, surface facing the light guide 101, and is preferably not in optical contact with the light guide 101.

Another difference between the embodiments of FIGS. 1 and 2 is that the light-entry portion 103 in the second embodiment has a first sub-portion 110 which has a slope and increases in thickness from the light-entry surface 105 towards the tapering portion 108. The slope of the sub-portion 110 is preferably in the range of 35°-45° in relation to the normal to the light-entry surface 105. If the slope angle is too small, this may lead to leakage of light, however, some leakage may be permitted. A slope angle substantially greater than 45° degrees is typically not desirable. One approach may be to start with a slope angle of about 45°, depending on the index of refraction, and use lower angles farther from the light-entry surface.

When the sub-portion 110 reaches the thickness $t_{lg}$ of the light guide 101, at a distance R2' from the center, there is a second sub-portion 108 of constant thickness, between distances R2' and R2 from the center, before the tapering portion 107 begins. The reason for the first sub portion 110 of increasing thickness is to reduce the risk of undesirable refraction out from the light guide. The sloped surfaces 112 of the sub-portion 110 reduce the angle of light incident directly from the light-entry surface 105, and thus facilitate TIR. A sloped first sub-portion 110 may be particularly advantageous when the light-emitting layer is in optical contact with the light-entry surface. (In a situation with optical contact and without the sloped first sub-potion 110, some light would be incident by approximately 90° in surfaces 109, 110.)

Some relations regarding the angular distribution in the plane of the light guide will now be given with reference to the two embodiments disclosed in the foregoing.

With optical contact between the light-entry surface and the light emitting layer, the following equations may be used in the design of the light guide:

$$\sin \phi = R1/R2 \qquad (Eq.\ 1a)$$

The angle φ may be considered a good approximation for the cut-off angle for rule-of-thumb estimates. R1, R2 and φ are in accordance with FIG. 1a and FIG. 2a.

Without optical contact between the light-entry surface and the light emitting layer, the following equation replaces Eq. 1a:

$$\sin \phi = R1/(n_{lg} * R2) \qquad (Eq.\ 1b)$$

with $n_{lg}$ being the refractive index of the light guide.

However, since the re-direction layer 121 may give a small but adverse contribution to the cut-off angle, it may be advised to have some margin when designing the light guide using the equations above.

For example, in a design with a cut-off of 10° in air, a light guide with a refractive index of 1.5 and a light-entry surface arranged at R1=20 mm from the center, Eq. 1b results in that R2 should be about 77 mm. In practice R2 may need to be larger than this to accomplish a cut off not exceeding 10°.

It should be noted that the angle β can be considered to determine the beam width in the direction orthogonal to the direction of φ and that thus both φ and β must be considered in order to have a narrow beam, i.e. for a narrow beam both φ and β should be small.

In the foregoing the refractive indices of the light guide and the re-direction layer have been about 1.5. Other refractive indices may be used, preferably in the range of 1.4-1.8. However, as will be recognized by the skilled person, the hitherto discussed dimensions, angles, etc. may need to be adapted accordingly, which the skilled person will be able to do based on the information disclosed herein.

The rotational symmetric luminaire arrangement that have been discussed in the foregoing may advantageously be used in a downlighting application. The luminaire arrangement enables provision of downlighting luminaires that have a flat front surface and that are much flatter than conventional luminaires, such as the Philips MASTER Line 111 Halogen lamp.

It can further be noted that light guide and any metallization may be manufactured at a relatively low cost, for example by using an injection molding process, which e.g. may be modified optical disk production process.

Figure 3A:
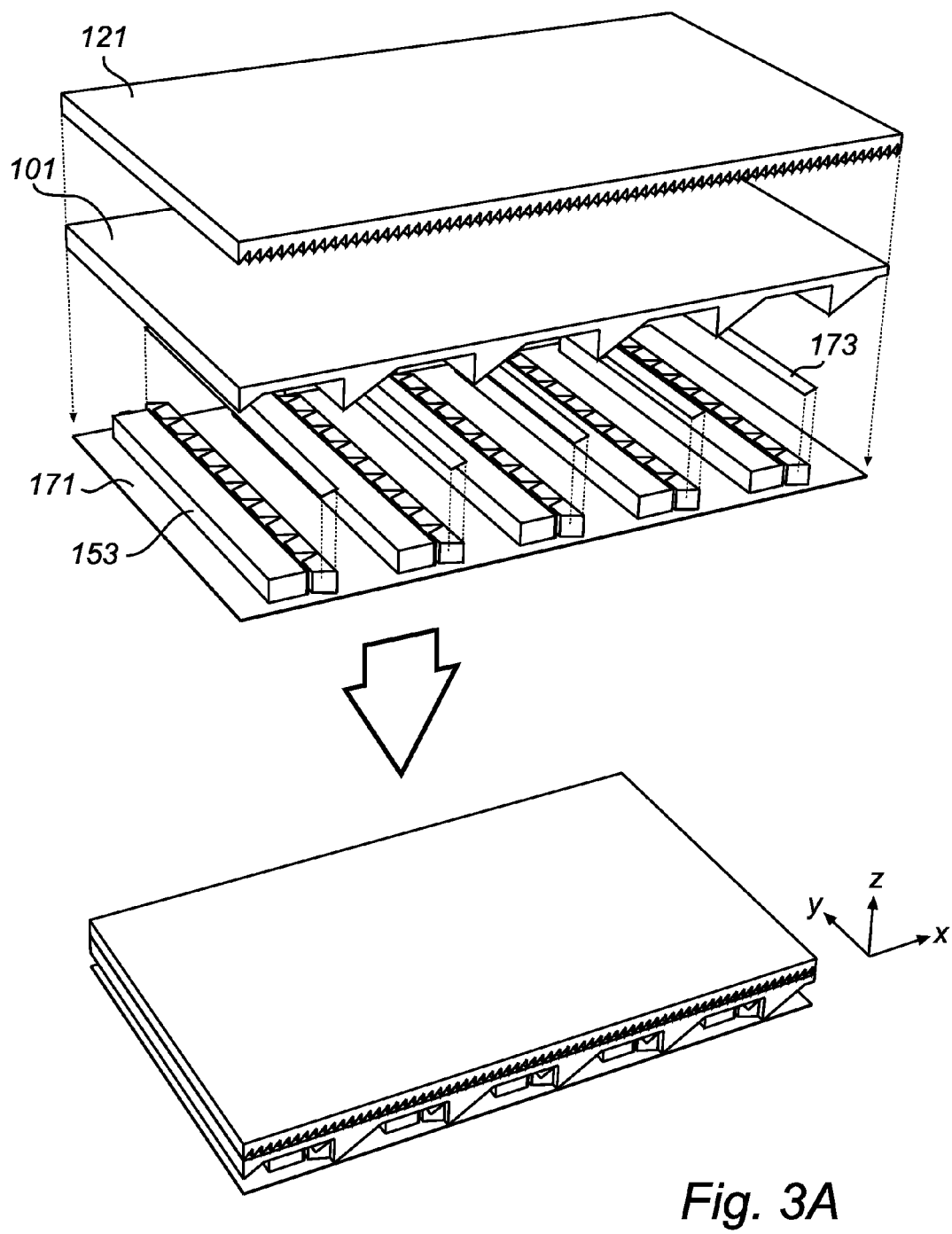
FIG. 3a shows a 3-dimensional perspective view of a luminaire arrangement according to a third embodiment.
Figure 3B:
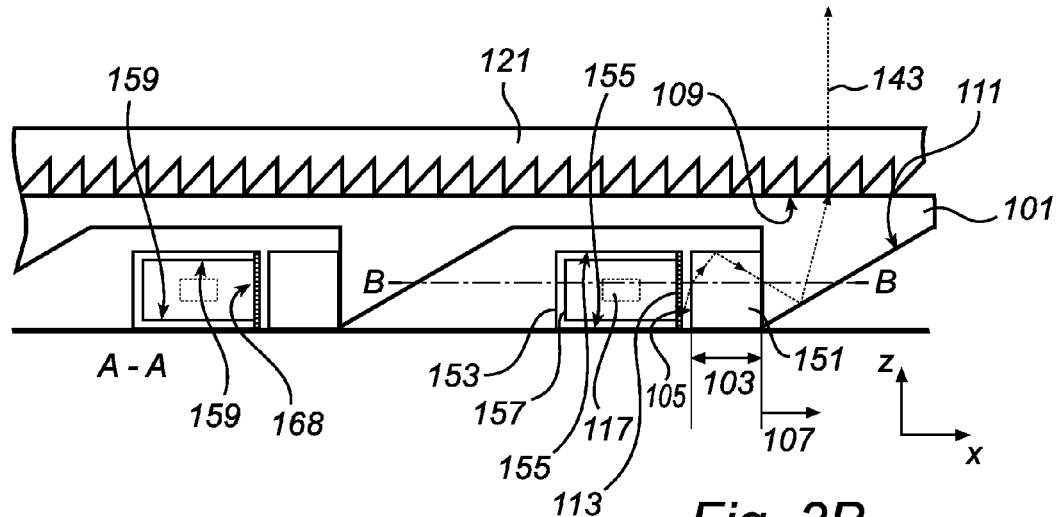
Figure 3C:
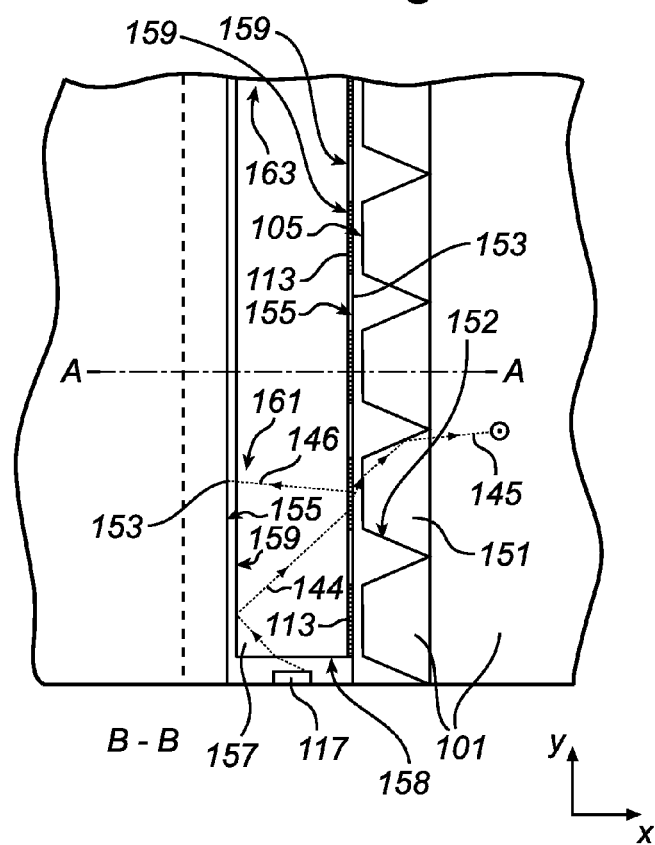

FIGS. 3a-3c show respectively a 3-dimensional perspective view, a side cross-sectional view and a top cross-sectional view of a luminaire arrangement, which is not rotational symmetric as in previous embodiments. The luminaire arrangement here is sequentially arranged with several blocks arranged to provide light to respective tapering portions 107 which are forming part of a light guide 101. Similar as in the previous embodiments presented herein, the tapering portions 107 are for directing light to a light exit surface 109, which the light passes to reach a redirection layer 121 which the light also passes through. For the tapering portion 107 and the re-direction layer 121 it is understood that the principles and functions are as in the previous embodiments. Material and type of light guide 131 and re-direction layer 121 may basically also be the same, but with the respective geometry adapted by the skilled person to the non-rotational symmetry case.

As seen in FIG. 3, the light entry portion 103 and tapering portion 107 of the light guide 101 are now in separate parts, this however is mainly for manufacturing and assembly reasons. The light guide 101 may as previously also be formed of a single light guide piece 101. The material of the light guide 101 may be the same as for the light guide 101 in previous embodiments. When in separate parts, the light entry portion 103 part and the tapering portion 107 part are preferably in optical contact with each other when the luminaire arrangement is in an assembled state.

The light entry portion 103 here comprises elements, or portions, in the form of collimator "cups" 151. More specifically each collimator 151 is in the form a truncated funnel with rectangular cross-section and linear slope. Each collimator 151 has constant thickness perpendicularly to the plane (x-y) of the luminaire and has increasing thickness in the plane (x-y) of the luminaire towards the tapering portion 107. There are multiple collimator cups lined in the y-direction, with the wider end of the funnel facing the reflecting surface 111 of the tapering portion 109. The reason not only a single collimator cup 151 is used, is owing to requirements on collimation. A single collimator cup 151 stretching too much in the y-direction would allow light to spread too much in that direction. It is realized that also other shapes of collimator cups 151 than here shown and described can be used to accomplish a corresponding effect.

In alternative embodiments the light entry portion may be in the form of a housing with fully reflecting inner lateral surfaces. By fully reflecting is in this context meant that the reflector have a negligible transmission of light, i.e. that virtually no light is allowed to pass. A fully reflecting reflector may e.g. be metallic, made from dielectric multilayers or white diffusive plastic materials. The housing is also preferably funnel shaped.

In one alternative example, a light source (not shown), such as a LED, is arranged directly at the narrow end surface, i.e. light-entry surface 105, of each collimator cup 151. However, disadvantages from this include that there is required as many such light sources as collimators 151, and as stated above, the number of cups may typically be determined by other requirements. Also, a light source directly providing light to each collimator 151 may result in undesirable bright spots in the light output from the luminaire arrangement, and a single malfunctioning light source may give a direct visible result in the light output from such luminaire. In the embodiment of FIG. 3 there is instead a respective light emitting layer 113, which may correspond to the previously discussed light emitting layer 113 of the previous embodiments, covering the light-entry surface 15 of each collimator 151. To increase the collimating effect, the light emitting layer 113 is preferably in non-optical contact with the collimator 151.

Still referring to FIG. 3, to guide light to the respective light emitting layer in the present embodiment there is provided a second light guide 157 of rectangular cross-section extending along the light entry surfaces of collimators 151 and on which the light emitting layers 113 for each collimator 151 are disposed in optical contact with the second light guide 157. Light is thus guided inside the second light guide 157 in a direction y that is perpendicular to the direction x of which light is guided by the collimators 151. It is realized that the second light guide 157 may have other cross-section shapes than rectangular in other embodiments. The light is coupled into the second light guide from one end 161 of the second light guide 157 via a light input surface 158. A LED 117 arranged opposite to the light input surface 158 is used as light source to provide the light for input. At an opposite end 163 of the light guide there is preferably arranged another LED (not shown) in a similar fashion for coupling light into the light guide from the opposite direction. The shown design allows the light to mix and distribute in the second light guide 157 before being output. The second light guide 157 is in the shown example enclosed by a reflector housing 153 with fully reflecting inner surfaces 155, preferably specular.

The housing 153 has openings for the light emitting layers 113, and is preferably in non-optical contact with the second light guide 157 to promote TIR inside the second light guide 157. One purpose of the housing 152 is to not let out light undesirably and instead reflecting it back, thereby increasing the amount of light that eventually will be output via the light emitting layers 113. The housing 153 prevents that light escapes undesirably and typically it only allows light to escape via the light emitting layers. It is mainly required for light that escapes the second light guide 157, for example light the is incident on lateral surfaces 155 (lateral in relation to the guide direction in the second light guide) of the second light guide 157 at non-TIR angles. This is e.g. the case for backscattered light from a light emitting layer 113 that is directed directly towards an opposite inner lateral surface 155 of the second light guide 157.

The housing 153, second light guide 157, light emitting layer 113 and collimators 151, may be arranged with non-optical contact on a light-blocking substrate 171, preferably having a fully reflecting surface. On top, in relation to the substrate, of the collimators 151, on their flat lateral surface, there may be arranged a light blocking layer 173, preferably a fully reflecting reflector layer, also in non-optical contact to prevent that light escape the collimator undesirably and contribute to the luminaire light output.

In another embodiment there is no complete housing 153 but instead reflecting portions arranged where escape of light from the second light guide 157 is possible, such as outside the second light guide 157 opposite to the light emitting layers.

In yet another embodiment the reflector housing 153 is arranged without the second light guide 157 to guide the light to the light emitting layers 113. The light emitting layers are in this case thus arranged to cover the openings without being attached to the second light guide.

In FIG. 3c there is shown a trace 144 of a light ray emitted from the light source 117. As can be seen the ray has been emitted into the light guide 157 at an angle that satisfies TIR conditions, and after reaching the light emitting layer 113 some light is backscattered and reaches the inner surface 155 of the second light guide 157 at a non-TIR angle, and the ray thus reaches the inner fully-reflecting surface 155 of the reflector housing. The light is thereby reflected back towards the second light guide, although not shown in the figure. The part of the light that was not backscattered from the light emitting layer 113 enters the collimator 151 and is directed (in the z-direction) by the light reflecting surface 111 of the tapering portion 107 towards the light exit surface 109, and will thus subsequently be output from the luminaire arrangement via the re-direction layer 121.

For efficient coupling into the second light guide 157, the light source is advantageously placed opposite to the light input surface 158, such as shown in FIGS. 3a-b. From the foregoing it is understood that outcoupling of light via the light emitting layers 113 is based on reflections, preferably by TIR, in the second light guide. The second light guide and the light source should thus advantageously promote TIR in the second light guide 157. A basic requirement for TIR is that minimum angle of incident light on a lateral surface is arcsin n1/n2, where n1 is the refractive index of an optically less dense medium, such as air, which is in optical contact with the second light guide having a refractive index n2, i.e. n2>n1.

Figure 4A:
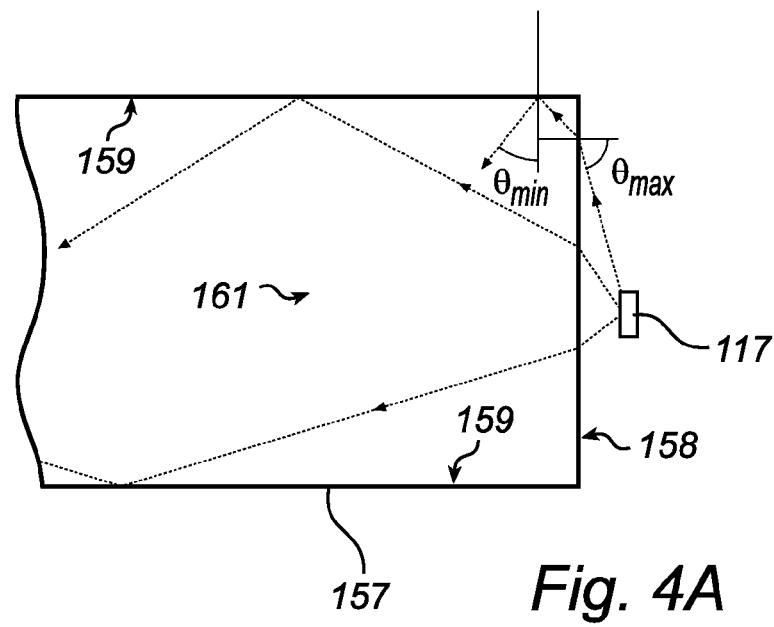
FIGS. 4a-c show examples of differently shaped light input surfaces of a light guide.

FIG. 4a shows the end 161 of the second light guide 157 in some detail. The light source 117 is arranged so that the there is a maximum angle $\theta_{max}$ of incident light on the light input surface 158. From basic geometry it is realized that the maximum angle $\theta_{max}$ after being refracted into the second light guide 157 give rise to a minimum angle $\theta_{min}$ of incident light on the lateral surface 159 inside the second light guide 157. If this minimum angle $\theta_{min}$ is equal to or larger than the angle required for TIR in the lateral surface, all incoupled light will be guided by TIR. It is further realized that the minimum angle $\theta_{min}$ decreases when the maximum angle $\theta_{max}$ increases, and that the maximum angle $\theta_{max}$ "at worst" is 90°, which typically can be regarded to be the situation when the light source 117 is very closely arranged to the light input surface 158 without being in optical contact. When the lateral surfaces 159 and the light input surface 158 interface the same optically less dense medium, say with refractive index $n_1$, and the second light guide has a refractive index $n_2$, the requirements for TIR become that $n_2 > n_1 * \sqrt{2}$, i.e. the refractive index of the second light guide 157 should be at least about 1.41 times the refractive index of the medium in optical contact with the second light guide 157. In the case of air being that medium, the second light guide 157 should thus have a refractive index $n_2$ of at least about 1.4 in order to make it possible for all light entering via the light input surface 158 to be guided by TIR. If the maximum angle $\theta_{max}$ can be controlled to be less than 90°, the requirements for TIR become less strict, but such control typically means that a more advanced light source has to be used.

A problem of having a light source opposite to the light input surface 158 is that some light typically will be directed in, or almost in, the guide direction into the second light guide 158 with no or only some reflections along the way and thus may reach the opposite end 163 without even being close to any light emitting layer 113. At the opposite end 163 the light may for example be undesirably absorbed, e.g. by another light source. This problem becomes greater when the thickness of the light guide increases for a rectangular light guide. Also, since many light sources are emitting a large amount of light centrally, the described problem may make certain light source types unsuitable as light source 117.

Figure 4B:
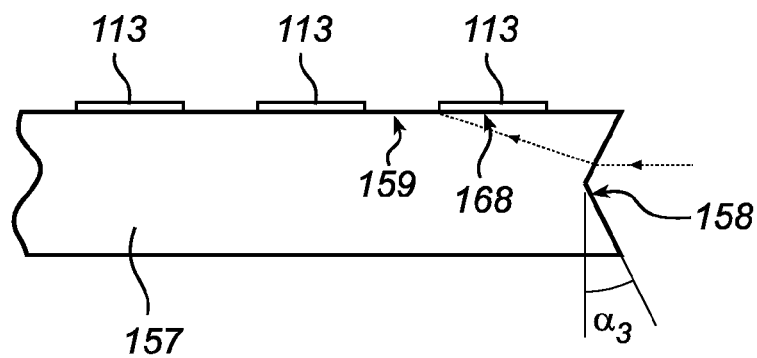
Figure 4C:
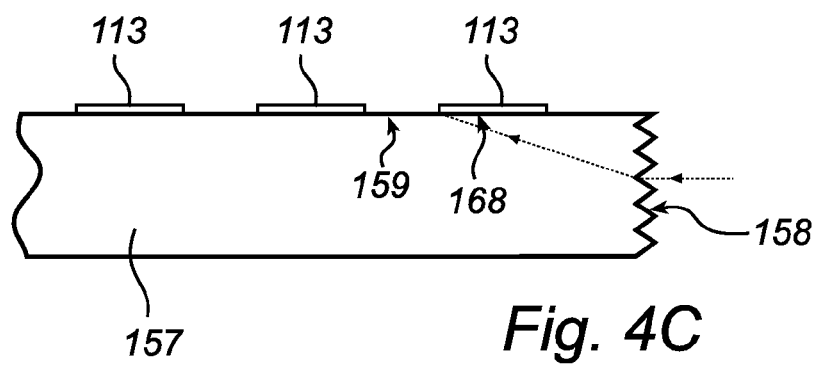

FIGS. 4b-c show examples of differently shaped light input surfaces 158 of a light guide 157, each which may be used as an alternative to a flat surface as presented in the above embodiments, and that alleviate the problem of light being directed into the light guide straight, or almost straight, in the guide direction with no or little chance to be incident on a light emitting layer 113. In FIG. 4b there is shown a concave light input surface 158 with linear slope, more specifically in the form of a v-shaped end with a centrally placed valley. It is realized that also other concave shapes may be used, such as with curved slope and/or where there is a slope towards the center from all edges. As a result from the concave shaped input surface 158, light that is incident in the guide direction y will hence be refracted towards the lateral surfaces 159 as illustrated by the dotted ray trace in the FIG. 4b. The concave shaped end has the additional advantage that it promotes accommodation of a LED dome.

FIG. 4c shows another option with similar result, namely a "saw-tooth" shaped input surface 158, here shaped with undulations with linear slope in the surface 158. Also here it is realized that other shapes may be used, such as undulations with curved slope etc.

The geometries of FIG. 4b-c are more stable for different thicknesses of the second light guide 157, for example, in one example implementation it was found that light extraction for a 3 mm thick second light guide 157 was about 54% with a concave end having a linear slope with an angle $\alpha_3$ of about 22°. This can be compared to light extraction of about 46% for a conventional straight end light guide 157.

Figure 5A:
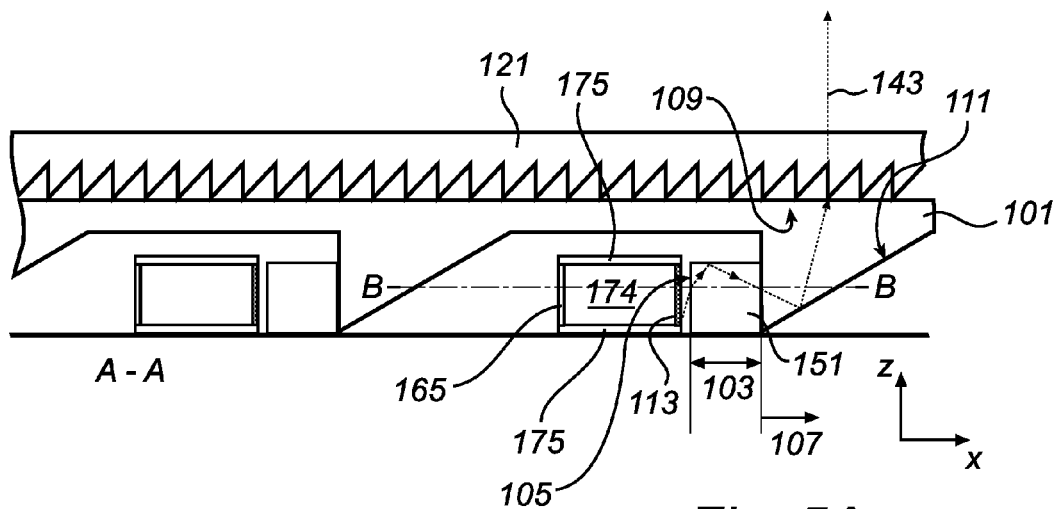
FIG. 5a-b show a respective side and top cross-sectional view a luminaire arrangement according to a fourth embodiment.
Figure 5B:
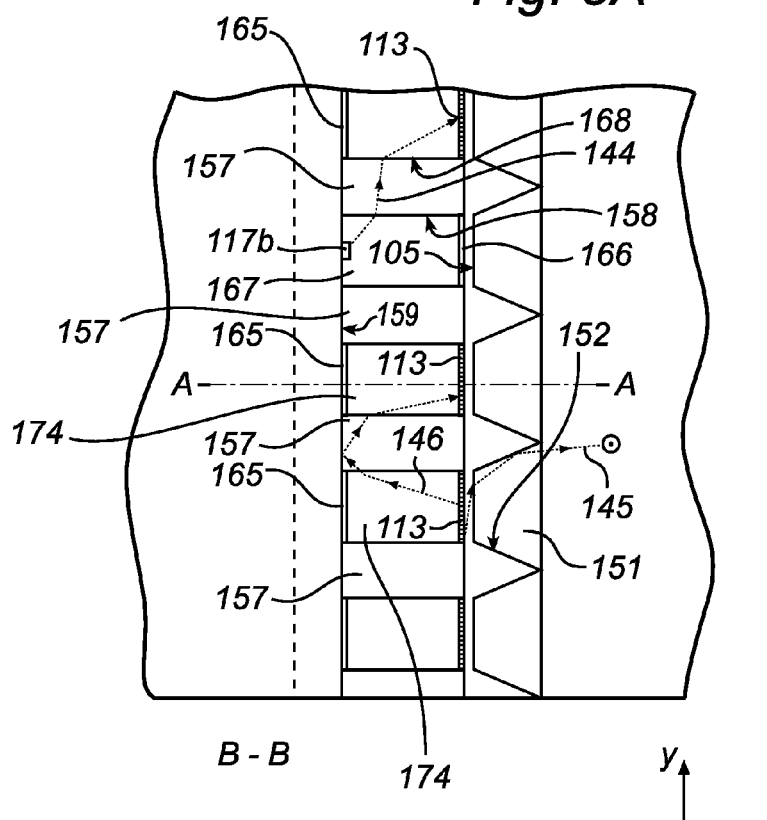

FIGS. 5a-b show a respective side and top cross-sectional view a luminaire arrangement according to a fourth embodiment. The fourth embodiment corresponds to the third embodiment except from the parts arranged to guide light to the light emitting layers 113. Here the light is guided via second light guide parts, or sections, 157 arranged in the guide direction y between light emitting layers 113. Each second light guide section 157 has at a light input surface 158 and a light exit surface 168, here perpendicular to the guide direction y. The light emitting layers 113 are arranged as previously in relation to the collimators 151, but are here in non-optical contact with the second light guide 157. Each light emitting layer forms a closing surface to an output cavity 174 on the second light guide 157 side. Closing surfaces to the output cavity 174 in the guide direction y is a respective light output surface 168 from two adjacent second light guide sections 157. Opposite to the light emitting layer there is a closing surface formed by a fully-reflecting reflector 165, preferably specular. Perpendicular to the plane x-y of the light guide, i.e. in the z-direction, the output cavity 174 is closed by fully-reflecting reflectors 175.

In FIG. 5b there is also shown a light input cavity 167. There may be one or many such light input cavities 167 in a luminaire, preferably instead of light output cavities 174 at predetermined positions. Closing surfaces to the input cavity 167 in the guide direction y is a respective light input surface 158 from two adjacent second light guide sections 157. A reflector 166, preferably diffusive, is arranged to close the cavity 167 towards the collimator 151. Opposite to the reflector 166, as closing surface, there is arranged a light source surface comprising a light source 117b, preferably a LED. In one alternative embodiment the light source surface and the reflector 166 has switched locations with each other, and in another embodiment there are two oppositely arranged light source surfaces and hence no reflector 166. The light source surface may comprise a LED mounted on a reflecting substrate. In the plane of the light guide, i.e. in the z-direction, the input cavity 167 is closed by reflectors 175, preferably diffusive.

The cavities 174, 167 are preferably filled with air or a similar medium that has lower refractive index than the second light guide portions 157. The difference in refractive index is advantageously at least about 1.4, for corresponding reason as given above, and which e.g. is the case if the cavities comprise air and the light guide portions 157 are of any of the light guide materials given as examples in the foregoing. An advantage of the fourth embodiment compared to the third embodiment is that also all light that is backscattered by the light emitting layers 113 and that enters a second light guide section 157 will be guided by TIR, i.e. not only the light coming from the light source side. This way light can be re-used in a more efficient way and the number of required reflections, at higher absorption, can be reduced. Owing to that there is always TIR in the light guide sections 157, it is not necessary with means, such as a reflector, arranged to shield the lateral sides of the sections 157. However, such means, e.g. a reflecting housing, may still be used, for example to enable simpler manufacturing and/or assembly. In one embodiment the reflecting closing surfaces 165 of the cavities 174 are portions of a reflecting housing.

In FIG. 5b there is shown exemplifying ray traces 145, 146, 144. Trace 144 corresponds to light from a light input cavity 166 that reaches and illuminates a light emitting layer 113 in a neighboring output cavity 174. Trace 145 corresponds to light emitted from a light emitting layer 113, such caused by illumination from a light source 117b, and which light is emitted towards the light entry portion 103, here a collimator 151, of the light guide 101. The light is refracted and directed by the collimator 151 to the reflecting surface 111 of the tapering portion 107 and is thereby directed to and passes through the light-exit surface 109, and then out from the luminaire in the z-direction via the light transmitting layer 121. Trace 146 on the other hand corresponds to light that is backscattered by the light emitting layer 113 and that enters an second light guide portion 157 via a light output surface 158, i.e. "backwards". The light is guided in the section 157 to a neighboring cavity 174 where the light due to refraction is directed to and become incident on another light emitting layer 113. In this example where no reflections in the reflectors inside the cavity participates, the backscattered light is re-used for illumination of a light emitting layer 133 at virtually no loss.

In one example implementation with the light guide sections 157 enclosed by and arranged inside a diffuse reflecting housing from which light can only escape via the light emitting layers (phosphor), the efficiency decreased from about 57% to about 28% when the light guide sections 157 were removed from the housing.

Light can be coupled into the second light guide sections 175 via a light input cavity 167 comprising a light source 117b as shown in FIG. 5b, but can also, as an alternative or supplement, be coupled into second light guide sections 157 by a light source 117 (not shown in the embodiment of FIG. 5) arranged to illuminate a light input surface 158, typically a peripheral second light guide section 157 with a surface 158 that is not a closing surface, for example a light source 117 arranged opposite to such surface 158 as described above in connection with the third embodiment.

Figure 6A:
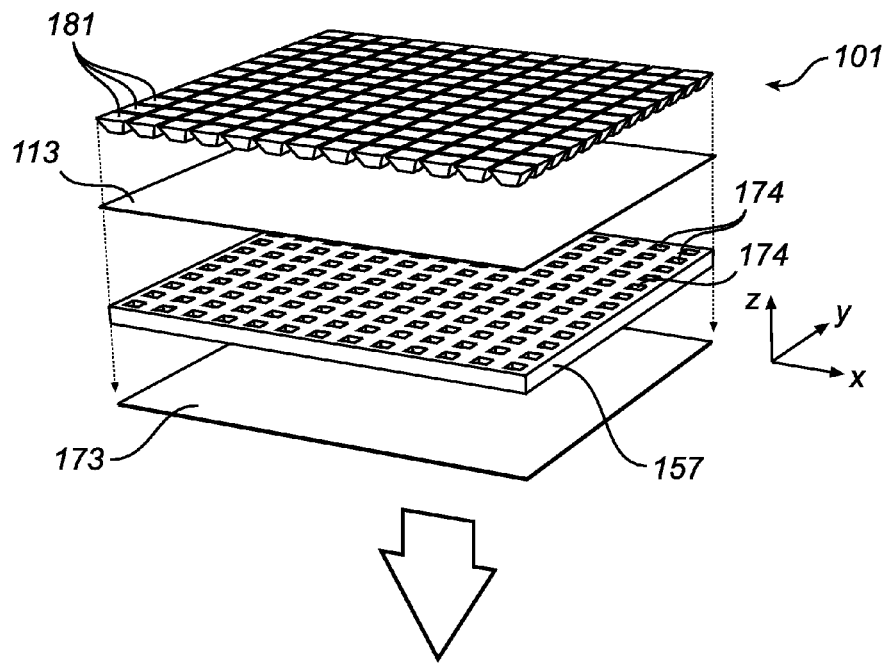
FIG. 6a-b show a respective 3-dimensional perspective view and side cross-sectional view of a luminaire arrangement according to a fifth embodiment.
Figure 6A:
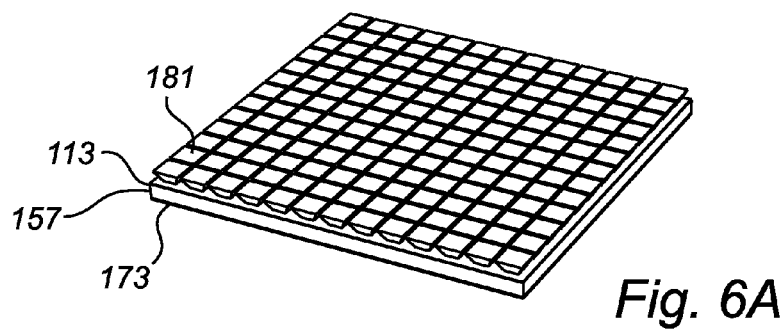
Figure 6B:
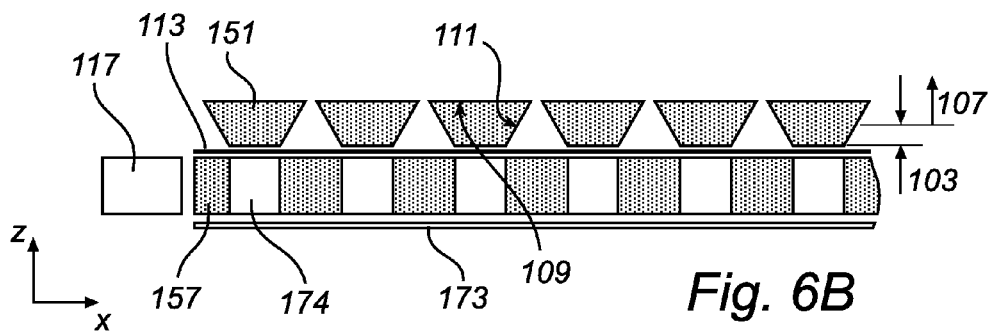

FIG. 6a-b show a respective 3-dimensional perspective view and side cross-sectional view of a luminaire arrangement according to a fifth embodiment. The optics for the output of light of this luminaire is more basic and straightforward than in the previous embodiments, but the principle of guiding light to a light emitting layer 113 using a second light guide 157 and cavities 174 is the same as in the fourth embodiment. The luminaire is here based on a stacked layer principle. On a substrate layer 173 there is arranged a light guide plate 157 with through holes 174, typically square. The side of the substrate layer 173 facing the light guide plate is preferably a fully reflecting reflector, preferably such that all holes 174 are being closed in one end by the reflector. On the other side of the light guide plate 157 there is arranged a light emitting layer 113, preferably covering all the holes of the plate. The result is hence that the through holes 174 are being closed and form cavities that correspond to the light input cavities described in connection with the fourth embodiment. One difference is though that all lateral sides of each cavity here are light guide surfaces and that there is thus not only a single guide direction axis y but instead a guide plane x-y for the light in the light guide 157. The light emitting layer 113 may be of the same material, such as phosphor, as described in connection with the previous embodiments. On the other side of the light emitting layer, i.e. towards the luminaire light output side, there is arranged a light guide layer 101 comprising collimating optic elements 181, similar to the collimator cups 151 of the third and fourth embodiment. The collimating optic elements 181 are in the form of truncated funnels. Each collimating element 181 has a light entry portion 103 with a light-entry surface, corresponding to the narrow end of the funnel, facing the light emitting layer 113 and a tapering portion 107 with a light-exit surface, corresponding to the wider end of the funnel, facing in the direction z for output of light from the luminaire.

Owing to the re-use effect of backscattered light provided by the light guide layer 174, where light is symmetrically guided by TIR both to and from the light emitting layer, the luminaire becomes more efficient.

The collimating elements 181 of the fifth embodiment are alone providing the collimating effect for the output of light, however, in other embodiments, there may be additional layers to further affect an output light beam. For example, a re-direction layer as in previous embodiments may be used.

From the above it should be understood that the light guides described herein, i.e. light guides for collimating output of light and light guides for guiding light to a light emitting layer, if not otherwise stated, preferably are dielectric, the light guides being adapted to guide light in the interior by reflections in inner surfaces, typically interface surfaces to the exterior of the light guide.

Moreover, from the foregoing is should be understood that the luminaires and light guides herein generally are flat and thin and that many problems relating to the solutions presented herein result from a desire of keeping luminaires thin and slim. A thin luminaire for output of a light beam in an output direction may be defined as a luminaire keeping the dimensions in the output direction at least 10 times smaller than the largest dimension in a plane that is perpendicular to the output direction. A thin light guide for guiding light along an axis or in a plane may be defined as a light guide having a dimension in at least one direction, which is perpendicular to the direction/plane in which the light guide is arranged to guide light, that is at least 10 times smaller than the largest dimension in said direction/plane.

Any illustration and description in the drawings and in the foregoing description are to be considered exemplary and not restrictive. The invention is not limited to the disclosed embodiments.

For example, the invention may be operated in an embodiment where the arrangement is not circle symmetric but instead e.g. hexagonal rotational symmetric, which may be advantageous since it allow multiple units of such an arrangement to be cooperatively placed side by side without any space between neighboring elements. Further, the invention may be operated in an embodiment where the arrangement is not symmetric at all, where the light emitting layer is not emitting light in response to excitation by light, but instead in response to excitation by e.g. electricity, the layer for example comprising an electro-optically active polymer material, etc.

Also, it should be understood that as long as there is no inherent incompatibility or explicit statement on the contrary, each feature that differs between embodiments may generally be used to replace a corresponding feature in, and/or supplement, another embodiment where the differing feature is missing.

The present invention is defined by the claims and variations to the disclosed embodiments can be understood and effected by the person skilled in the art in practicing the claimed invention, for example by studying the drawings, the disclosure, and the claims.

Use of the word "comprising" in the claims does not exclude other elements or steps, and use of the article "a" or "an" does not exclude a plurality. Occurrence of features in different dependent claims does not per se exclude a combination of these features. Any reference signs in the claims are for increasing intelligibility and shall not be construed as limiting the scope of the claims.

The invention claimed is:

1. An optical arrangement comprising:
    a light guide (101) having
        a light-entry portion (103) with a light-entry surface (105),
        a tapering portion (107) with a light reflecting surface (111),
        a light-exit surface (109),
    the light-entry portion (103) being arranged to guide light from the light-entry surface (105) in a first direction (x) towards the light reflecting surface (111), the light reflecting surface being arranged in relation to the first direction (x) so that incident light from the light-entry portion (103) is reflected towards the light-exit surface (109);
    a light transmitting layer (113) adapted to transmit light diffusively and arranged to cover at least a portion of the light-entry surface (105) of the light guide (101), wherein the light transmitting layer is a light emitting layer adapted to emit light in response to excitation by light;
    a light source arranged to directly or indirectly illuminate the light transmitting layer;
    a re-transmitting light source (115) arranged to illuminate the light transmitting layer (113) in response to illumination by the light source (117);
    a transmissive re-direction layer (121), which covers the light-exit surface (109) of the light guide (101) and has triangular elements (123) formed in the surface of the layer facing the light-exit-surface (109) of the light guide (101); and
    a second light guide (153; 157) arranged to guide light to the light transmitting layer (113), said second light guide being adapted to guide light in the second light guide's interior along a guide direction (y) using reflections in lateral surfaces (155; 159) of the second light guide, which surfaces are substantially parallel to said guide direction (y), the second light guide having a light input area (158) for in-coupling of light and a light output area (168) for output of light to the light transmitting layer (113), wherein the light output area (168) is arranged at a distance from the light input area (158) in the guide direction (y).

2. The optical arrangement as claimed in claim 1, wherein the light emitting layer is a phosphor layer.

3. The optical arrangement as claimed in claim 1, wherein the light-entry surface (105) and the light transmitting layer (113) encircle a space (102).

4. The optical arrangement as claimed in claim 1, wherein the light transmitting layer (113) is in optical contact with the light-entry surface (105).

5. The optical arrangement as claimed in claim 1, wherein the light-entry portion (103) increases in thickness from the light-entry surface (105) towards the tapering portion (107).

6. The optical arrangement as claimed in claim 1, wherein the second light guide (157) is of a dielectric material capable of guiding light inside the material, the light input area and the light output area corresponding to input surface (158) and output surface (168) of said light guide (157), respectively.

7. The optical arrangement as claimed in claim 6, wherein the light input area (158) intersects the guide direction (y), and the light input surface (158) is in optical contact with a dielectric medium of lower refractive index, whereby any light provided to be incident on the light input surface (158) will pass through this medium and be coupled into the second light guide (157) at angles within a determined angular interval that is more narrow than an angular interval of the incident light.

8. The optical arrangement as claimed in claim 6, wherein the light output surface (168) is a portion of one of the lateral surfaces (159), which portion is in optical contact with and at least partially covered by the light transmitting layer (113).

9. The optical arrangement as claimed in claim 6, wherein the light output surface (168) intersects the guide direction (y), the light output surface being in optical contact with a dielectric medium of lower refractive index, such as air, whereby light leaving the second light guide via the light output surface passes through this medium.

10. The optical arrangement as claimed in claim 9, wherein the light output surface (168) is arranged substantially perpendicularly in relation to the light transmitting layer (113).

11. The optical arrangement as claimed in claim 9, wherein the light entry portion (103) comprises a funnel-shaped portion (151) with a wider end of the funnel facing the tapering portion (107) and a narrow end of the funnel comprising the light-entry surface (105).

12. The optical arrangement as claimed in claim 9, wherein all cavity surfaces perpendicular to the light transmitting layer (113) are light output surfaces (168) of the second light guide (157).

13. The optical arrangement as claimed in claim 1, wherein the light source comprises at least one light-emitting diode.

* * * * *